Patented Aug. 10, 1954

2,686,145

UNITED STATES PATENT OFFICE 2,686,145

WATER SOLUTION OF KHELLIN

Lyell J. Klotz, Cincinnati, and Joseph B. Vaughan, Norwood, Ohio, assignors to Lloyd Brothers, Inc., Cincinnati, Ohio, a corporation of Ohio No Drawing. Application April 19, 1951, Serial No. 221,941

8 Claims. (Cl. 167—65)

This invention relates to the compound dimethoxy methyl furanochromone, commonly known as khellin. Khellin may be represented by the structural formula

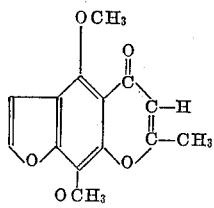

More particularly the invention relates to aqueous solutions containing high concentrations of khellin and which may be used therapeutically and administered parenterally.

Khellin has been found to be valuable in the treatment of angina pectoris and bronchial asthma. However, it is virtually insoluble in water, being soluble in water to an extent of less than 1 mg. per ml. at room temperature. An object of this invention is to provide a water base solution of khellin which contains a sufficient concentration of khellin to be suitable to be administered by injection.

It is desirable to administer doses of khellin in the order of 10 to 50 mg. or more. A further object of this invention is to provide an aqueous solution of sufficient concentration to contain this amount of khellin in a quantity of the order of 1 to 5 ml. so that it can be administered conveniently by injection.

We have found that khellin is much more soluble in aqueous solutions of sodium saccharin than in water. Solutions of the potassium and ammonium salts of saccharin also dissolve substantially more khellin than can be dissolved in water alone.

The quantity of khellin which will dissolve in aqueous sodium saccharin solutions at room temperature, increases with the amount of sodium saccharin dissolved in the solution. Thus, sodium saccharin in 30% concentration (30 grams of sodium saccharin in sufficient water to make 100 ml.) will dissolve less than 20 mg. of khellin per ml. of the sodium saccharin solution. A solution of 50% concentration will dissolve about 30 mg. of khellin per ml. of the sodium saccharin solution, and a solution of 60% concentration will dissolve about 35 mg. of khellin, per ml., all at room temperatures.

We have further found that when benzyl alcohol is added to an aqueous solution of sodium saccharin, the amount of khellin which can be dissolved in the solution is substantially greater than will be dissolved by sodium saccharin solution alone. The benzyl alcohol serves two purposes. It increases the capacity of the solution to dissolve khellin and also acts as a local anesthetic and is of additional value therapeutically for this reason. We have found, for example, that whereas a 50% sodium saccharin solution (50 grams of sodium saccharin in sufficient water to make 100 ml.) will dissolve only about 30 mg. of khellin per ml. of solution, a 50% sodium saccharin solution containing also 4% benzyl alcohol will dissolve about 50 mg. of khellin per ml. of solution.

The following examples illustrate the product and method of preparation thereof in greater detail, but it is to be understood that the examples are given primarily by way of illustration and that the invention is not intended to be limited thereby except as set out in the appended claims.

Example I 0.5 gram of chlorobutanol and 50.0 grams of sodium saccharin were dissolved in approximately 60 ml. pyrogen-free, sterile distilled water, the water being heated to approximately 80 degrees C. to expedite solution. 2.5 grams of pure crystalline khellin were added to the solution and heating continued until solution was complete. Finally, the solution was cooled and sufficient water was added to bring the volume to exactly 100 ml. with additional pyrogen-free sterile distilled water.

Example II 0.5 gram of chlorobutanol and 50 grams of sodium saccharin were dissolved in about 60 ml. of pyrogen-free sterile distilled water. The water was heated to a temperature of approximately 80 degrees C. to speed solution. 5.0 grams of pure crystalline khellin were added to the sodium saccharin solution and the solution was further heated until solution was complete. Then the solution was filtered. While the solution was still warm, 4.0 ml. of benzyl alcohol were added. Then the solution was cooled and sufficient pyrogen-free sterile distilled water was added to bring the volume of the solution to 100 ml.

The solutions can be stored in suitable containers and may be rendered sterile by known methods as outlined in U. S. P.

The chlorobutanol is present as a preservative and bacteriostatic agent. Other suitable agents such as phenol or one of the cresols may be substituted for the chlorobutanol, if desired.

In addition, if desirable, certain other substances may be added to the solution. For example, sodium chloride, sodium phosphate, or other agents may be added to render the solution isotonic. Other therapeutic agents may also be added to give products having additional therapeutic activity.

Having described our invention, what we claim as new and desire to secure by Letters Patent is:

1. An aqueous solution of khellin which comprises water, khellin, and a solubilizing agent selected from the group consisting of the saccharin salts of sodium, potassium, and ammonium, the solution containing a substantially greater concentration of khellin than 1.0 mg. per ml., the concentration of khellin and of solubilizing agent being insufficient to render the solution saturated at room temperature.

2. A solution in accordance with claim 1 characterized by the fact that the solution includes a substantial amount of benzyl alcohol dissolved therein.

3. A solution in accordance with claim 1 characterized by the fact that the solution includes a substantial amount of benzyl alcohol dissolved therein and that the concentration of khellin is greater than can be held in solution in water and the solubilizing agent alone at room temperature.

4. An aqueous solution of khellin which comprises approximately 50 grams of sodium saccharin and 2.5 grams of khellin per 100 ml. of solution.

5. An aqueous solution of khellin which contains approximately 50 grams of sodium saccharin, 5.0 grams of khellin, and 4 ml. of benzyl alcohol per 100 ml. of solution.

6. An aqueous solution of khellin which contains approximately 50 grams of sodium saccharin, 5.0 grams of khellin, 0.5 gram of chlorobutanol, and 4.0 ml. of benzyl alcohol per 100 ml. of solution, the remainder being substantially all water.

7. An aqueous solution of khellin which comprises water, khellin, and a water soluble salt of saccharin, the solution containing a substantially greater concentration of khellin than 1.0 mg. per ml., the concentration of khellin and of solubilizing agent being insufficient to render the solution saturated at room temperature.

8. An aqueous solution of khellin comprising water, khellin, and a solubilizing agent of the class consisting of saccharin salts of sodium, saccharin salts of potassium, and saccharin salts of ammonium, the concentration of khellin being greater than 1.0 mg. per ml.

References Cited in the file of this patent

UNITED STATES PATENTS

| Number | Name | Date |
| --- | --- | --- |
| 343,803 | Fahlberg | June 15, 1886 |
| 2,190,749 | Worne | Feb. 20, 1940 |

OTHER REFERENCES

The Extra Pharmacopoeia, vol. 1, 22nd ed., The Pharmaceutical Press, 1942, page 320.